(12) United States Patent  
Reed et al.

(10) Patent No.: US 8,614,883 B2
(45) Date of Patent: Dec. 24, 2013

(54) ASSEMBLY OF A HAND HELD COMPUTER TERMINAL HOUSING

(75) Inventors: Sherri Reed, Charlotte, NC (US); Eric Linn, Fort Mill, SC (US); Timothy R. Fitch, Syracuse, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 184 days.

(21) Appl. No.: 13/169,505

(22) Filed: Jun. 27, 2011

(65) Prior Publication Data

US 2012/0327577 A1 Dec. 27, 2012

(51) Int. Cl.
*G06F 1/16* (2006.01)

(52) U.S. Cl.
USPC .... 361/679.03; 710/303; 439/626; 455/404.2

(58) Field of Classification Search
USPC ............ 277/637; 710/260, 72, 8, 303, 13, 62, 710/300; 29/428, 509, 761; 439/133, 331, 439/350, 460, 391, 131, 626, 188; 361/679.56, 679.32, 679.01, 679.31, 361/679.6, 679.17, 679.48, 679.33, 679.23, 361/679.03, 679.15, 679.21, 679.27; 455/558, 334, 550.1, 517, 456.1, 455/404.2, 456.3, 418, 556.1; 235/383, 235/375, 385, 494, 454
See application file for complete search history.

(56) References Cited

U.S. PATENT DOCUMENTS

| | | | |
|---|---|---|---|
| 5,023,824 A | 6/1991 | Chadima, Jr. et al. | |
| 5,805,416 A | 9/1998 | Friend et al. | |
| 6,724,618 B1 | 4/2004 | Jenkins et al. | |
| 2005/0210173 A1* | 9/2005 | Kehoe et al. | 710/260 |
| 2006/0054704 A1 | 3/2006 | Fitch et al. | |
| 2009/0168337 A1 | 7/2009 | Conti et al. | |
| 2012/0326397 A1* | 12/2012 | Reed et al. | 277/637 |

OTHER PUBLICATIONS

Nov. 13, 2012 European Search Report in European Application No. 12172839.8.
Nov. 29, 2012 Communication Pursuant to Article 94(3) EPC in European Application No. 12172839.8.

* cited by examiner

*Primary Examiner* — Hung Duong
(74) *Attorney, Agent, or Firm* — Additon, Higgins, Pendleton & Ashe, P.A.

(57) ABSTRACT

A bottom cap of a housing of a hand held computer terminal is provided. The bottom cap comprises a strap mount and a releasable fastener. The releasable fastener can releasably fasten the bottom cap to a main body of the housing. The strap mount comprises an electrical connector opening for mounting an electrical connector to the bottom cap.

19 Claims, 2 Drawing Sheets

ASSEMBLY OF A HAND HELD COMPUTER TERMINAL HOUSING

FIELD OF THE INVENTION

The present invention relates to a hand held computer terminal in general and specifically to an assembly of a housing of a hand held computer terminal.

BACKGROUND OF THE PRIOR ART

Hand held computer terminals can be used for a variety of purposes. Indicia reading terminals, for example, have been used for a number of years in industrial data collection applications and for purposes of decoding information encoded in bar code symbols. Many hand held computer terminals, such as indicia reading terminals, are multifunctional and/or have broad computing capabilities. The computational functionalities of hand held computer terminals are enabled by electronic components and other hardware.

The packaging of these electronic components into a housing of hand held computer terminal can be complex, with many factors influencing the housing design. For instance, the hand held computer terminal can be designed to prevent ingress of external pollutants, increase ergonomic function, increase durability, increase accessibility, and decrease manufacturing and repair costs.

The internal electronic components can be damaged by external pollutants, such as water, dirt, dust, or other debris. When water ingresses the housing, the water is likely to cause electrical shorts, corrosion, or other damage. Electrical shorts can cause temporary or permanent malfunctions. Corrosion and other physical damage can also cause permanent malfunctions. Likewise, while sometimes less intrusive, dirt, dust, or other debris can be problematic, causing problems ranging from a nuisance to severe damage.

Ergonomics and durability also influence the design. As a hand held device, hand held computer terminals can be considered more desirable to use when fitted comfortably in a hand. A hand strap can make it easier to hold the hand held computer terminal, and less likely to drop the hand held computer terminal, especially when the hand held computer terminal is held for longer periods of time. Resistance to damage from physical impact is beneficial, as well, for example, when the hand held computer terminal is mishandled or dropped.

The accessibility of the hand held computer terminal to repair defective or broken parts, or to otherwise assemble, disassemble, and/or reassemble the hand held computer terminal can also influence the design. Efficient assembly, disassembly, and/or reassembly can lower manufacturing or repair costs and save time.

Optimizing one factor in the mechanical design of a hand held computer terminal can diminish the optimization of another factor, making it a complex matter to configure the mechanical design of a hand held computer terminal for balanced efficiency and/or overall optimization, wherein the hand held computer terminal is well sealed, durable, ergonomically efficient, and easily repairable, all while being cost efficient to manufacture or repair.

In one method of packaging the components, a clamshell style housing has a front housing member and a back housing member that are fastened together to enclose the electronic components. A hand strap can be mounted as a separate piece screwed or ultrasonically welded to the back housing member. This design is cumbersome and costly. Further, repair and/or replacement of some components requires labor intensive processes and discarding of expensive parts. For instance, with the clamshell style housing, an electrical connector (e.g., a charge/communication connector) located at the bottom of the hand held computer terminal is mounted to the front housing member or the back housing member. The front housing member and the back housing member must be dismantled to access and replace the electrical connector. The electrical connector is soldered to the housing member, so the electrical connector is often removed and re-soldered to a replacement housing member, while the removed housing member is discarded.

It would be useful to have a hand held computer terminal that cost efficiently facilitates sealing, durability, ergonomics, and accessibility, and reduces or avoids the problems identified herein above.

SUMMARY OF THE INVENTION

In one embodiment, a hand held computer terminal comprises a housing. The housing comprises a main body and a bottom cap. The main body comprises a bottom opening and the bottom cap fits over the bottom opening. The bottom cap comprises a strap mount for attaching a hand strap, and an electrical connector opening for mounting an electrical connector.

In another embodiment, a bottom cap of a housing of a hand held computer terminal comprises a strap mount and a releasable fastener. The releasable fastener releasably fastens the bottom cap to a main body of the housing. The strap mount comprises an electrical connector opening for mounting an electrical connector to the bottom cap.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
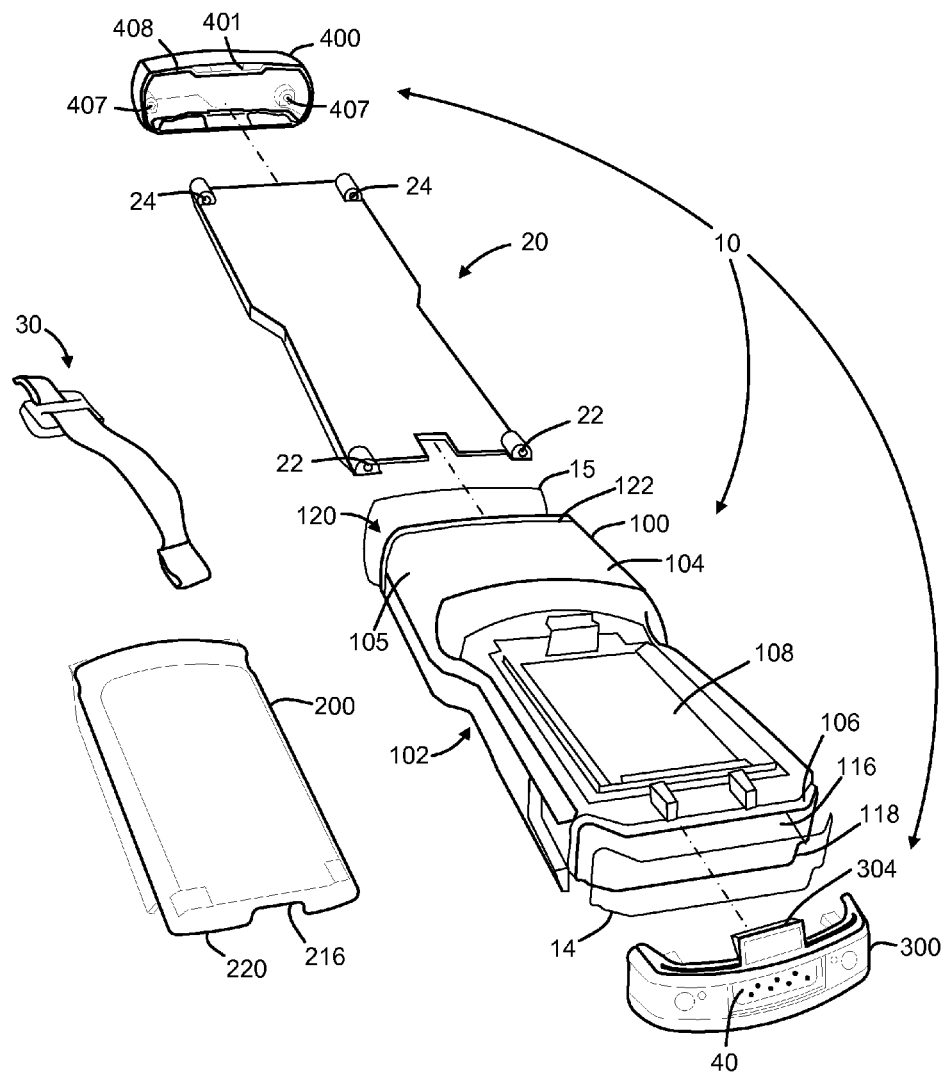
FIG. 1 is an exemplary isometric representation of a housing, an internal frame member, and a hand strap of a hand held computer terminal in an unassembled state, in one embodiment.

FIG. 1 is an exemplary representation of a housing 10, an internal frame member 20, a strap 30, and an electrical connector 40 of a hand held computer terminal in an unassembled state. The hand held computer terminal illustrated in FIG. 1 is an image sensor based indicia reading terminal. This indicia reading terminal of FIG. 1 is exemplified herein throughout to illustrate and describe the apparatus and method of assembling the housing of a hand held computer terminal. One of ordinary skill in the art would recognize alternative types of hand held computer terminals for which the housing herein described would apply.

Referring to FIG. 1, the housing 10 can comprise a main body 100, a battery compartment door 200, a bottom cap 300, and a top cap 400. The main body 100 has a front side 102, a back side 104, a top side 105, and a bottom side 106. The front side 102 and the back side 104 can each be a separate piece fastened together to form a clamshell structure, or the front side 102 and the back side 104 can be one continuous piece forming a tube structure. The two-piece clamshell structure has a joint between the front side 102 and the back side 104, where pollutants can potentially ingress. The one-piece, tube structure is continuous between the front side 102 and the back side 104, and can better resist the ingress of pollutants between the front side 102 and the back side 104 of the main body 100 than the two-piece, clamshell structure. The one-piece, tube structure of the main body 100 can also be more resistant to physical impact than the two-piece structure of the main body 100.

The main body 100 can define a bottom opening 116, a top opening 120, and a battery compartment opening 108. The top opening 120 can be assembled on the top side 105 of the main body 100. The top opening 120 can have a perimeter defined by top perimeter walls 122. The top perimeter walls can be relatively thin compared to the majority of the walls of the main body 100.

The internal frame member 20 can be inserted into the main body 100 in an assembled state or removed from the main body 100 in a disassembled state. FIG. 1 shows the internal frame member partially inserted, or slid, into the main body 100. The internal frame member can be rigid or stiff, comprised of rigid or stiff material. For example, the internal frame member 20 can be comprised of magnesium, a magnesium alloy, or another rigid material. When assembled with the housing 10, the internal frame member 20 can be fastened to the housing 10. For example, the internal frame member can comprise a plurality of fasteners to fasten the internal frame member 20 to the housing 10. In the illustrated embodiment, the internal frame member 20 comprises top fastening holes 24 and bottom fastening holes 22. These fastening holes 22, 24 can be internally threaded to accept screws through the housing.

The battery compartment opening 108 can be on the back side 104 of the main body 100. Other openings can be defined as well, such as a top opening 110, and other openings for extension of buttons, keys, and other features through the main body 100.

The bottom opening 116 of the main body 100 can be on the bottom side 106 of the main body 100. The bottom opening 116 can have a perimeter defined by bottom perimeter walls 118. The bottom perimeter walls 118 can be relatively thin compared to the majority of the walls of the main body 100.

The top cap 400 can be stronger than the main body 100, by comprising a stronger material, by comprising thicker walls, and/or by comprising reinforcing structures, such as reinforcement ridges 401, to add structural strength. The additional strength of the top cap 400 can protect the hand held computer terminal from physical shock, the type of which can occur when the hand held computer terminal is dropped. When the hand held computer terminal is dropped, the top or the bottom of the device is most likely to be directly impacted.

The top cap 400 can have a top releasable fastener and a slot 408 extending around the inside surface of the top cap 400. In the illustrated embodiment, the releasable fastener comprises top fastener holes 407. The top cap 400 can be assembled on the top side 105 of the main body 100 to cover the top opening 120. When the top cap 400 is assembled onto the main body 100, the top cap 400 can fit over the top opening 105 of the main body 100. For example, the top perimeter walls 122 of the top opening 120 can fit into the slot 408 of the top cap 400. A relatively small or minimal clearance can be provided between the top perimeter walls 122 and the slot 408 of the top cap 400 to facilitate better sealing and a more secure fit. The outer surfaces of the main housing 100 and the outer surfaces of the top cap 400, at the joint between the main body 100 and the top cap 400, can substantially align to form a smooth seam. A top gasket 15 can be positioned between the top cap 400 and the main body 100 to seal the joint. The top gasket 15 can be a conventional gasket, such as a gasket made of rubber or plastic, or the top gasket 15 can be foamed into place. The top cap 400 can be tightened to the main body 100, for example, by driving screws through the top fastening holes 407 of the top cap 400 into top fastening holes 24 of the internal frame member 20.

The battery compartment door 200 can be assembled and fastened with a releasable fastener on the back side 104 of the main body 100 to cover the battery compartment opening 108. The battery compartment door 200 is generally sized and shaped to match and correspond with the battery compartment opening 108. A bottom edge 220 of the battery compartment door can mate with the bottom cap 300. The battery compartment door 200 can comprise a bottom cap slot 216. The bottom cap slot 216 can be a cutout section at the bottom edge 220 of the battery compartment door 200.

Figure 2:
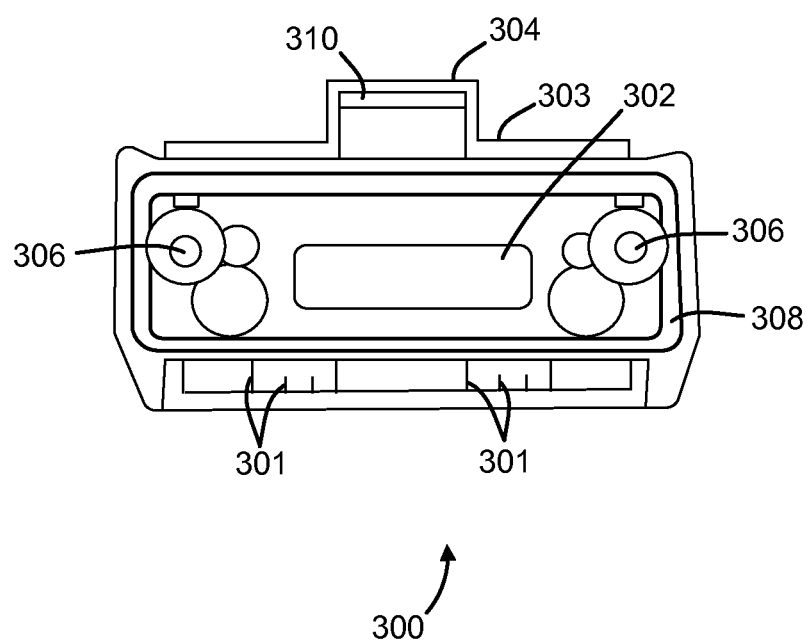
FIG. 2 is an exemplary inside view of the bottom cap of FIG. 1.

FIG. 2 is an exemplary inside view of the bottom cap 300 of FIG. 2. The electrical connector 40 is shown mounted to the bottom cap 300. Referring to FIG. 1 and FIG. 2, the bottom cap 300 can be assembled on the bottom side 106 of the main body 100 to cover the bottom opening 116. The bottom cap 300 can be stronger than the main body 100, by comprising a stronger material, by comprising thicker walls, and/or by comprising reinforcing structures, such as reinforcement ridges 301, to add structural strength. The additional strength of the bottom cap 300 can protect the hand held computer terminal from physical shock, the type of which can occur when the hand held computer terminal is dropped. When the hand held computer terminal is dropped, the top or the bottom of the device is most likely to be directly impacted.

The bottom cap 300 can have a connector opening 302, a strap mount 304, and/or a bottom releasable fastener. In the illustrated example, the releasable fastener comprises bottom fastener holes 306. The bottom cap 300 can also have a slot 308 extending around the inside surface of the bottom cap 300.

The electrical connector 40 can be fastened to the bottom cap 300 so that the electrical connector 40 extends through the connector opening 302 and/or faces outward from the bottom cap 300. The electrical connector 40 can be removably attached so that the electrical connector 40 can be removed from the electrical connector with access to the inside of the bottom cap 300. Otherwise, the electrical connector 40 can be permanently attached so that the bottom cap 300 would likely be discarded when replacing the electrical connector 40. In one example, the electrical connector 40 is soldered to the bottom cap 300.

The strap mount 304 can be integral with the bottom cap 300 and can comprise, for example, a strap opening 310 through which the strap 30 can extend. In one embodiment, the strap mount 304 can project from the bottom cap 300. The bottom cap 300 can comprise a back edge 303, wherein the strap mount 304 comprises a projection projecting from the back edge 303, and wherein the projection defines the strap opening 310 through the projection. When assembled with the battery compartment door 200 and the main body 100, the strap mount 304 can project into and fit within the bottom cap slot 216. In another alternative, the battery compartment door 200 can be isolated from the bottom cap 300, the main body 100 can comprise the bottom cap slot 216, and the strap mount 304 can project into and fit within the bottom cap slot 216 in the main body 100.

When the bottom cap 300 is assembled onto the main body 100, the bottom cap 300 can fit over the bottom opening 106 of the main body 100. For example, the bottom perimeter walls 118 of the bottom opening 116 can fit into the slot 308. A relatively small or minimal clearance can be provided between the bottom perimeter walls 118 and the slot 308 to facilitate better sealing and a more secure fit. The outer surfaces of the main housing 100 and the outer surfaces of the bottom cap 300, at the joint between the main body 100 and the bottom cap 300, can substantially align to form a smooth seam. A bottom gasket 14 can be positioned between the bottom cap 300 and the main body 100 to seal the joint. The bottom gasket 14 can be a conventional gasket, such as a gasket made of rubber or plastic, or the bottom gasket 14 can be foamed into place.

The bottom cap 300 can be tightened to the main body 100, for example, by driving screws through the fastening holes 306 into the main body 100 or another component internally connected to the main body 100. In one embodiment, the internal frame member 20 can be positioned and/or fastened inside the main body 100, and the bottom cap 300 can be tightened to the main body 100 by driving screws through the bottom fastening holes 304 of the bottom cap 300 into the bottom fastening holes 22 of the internal frame member 20. The bottom fastening holes 22 of the internal frame member 20 can be internally threaded.

Replacing the electrical connector 40 can be accomplished by unfastening the bottom cap 300, replacing the bottom cap 300 with another connector 40, and reassembling the bottom cap 300 to the main body 100 and/or the battery compartment door 200. In some embodiments, the bottom cap 300 can be unfastened and replaced with a different bottom cap 300 and a different electrical connector 40. Replacing the bottom cap 300 is relatively inexpensive compared to replacing the front piece or the back piece of a two-piece clamshell style housing 10.

Integrating the strap mount 304 as part of the bottom cap 300 is less cumbersome than mounting the strap to the back of the housing 10 using screws or ultrasonic welding. Additionally, the greater durability and strength of the bottom cap 300 relative to the main body 100 facilitates greater durability and strength withstanding forces imparted to the strap 30. Further, in the case that the strap mount 304 breaks, the bottom cap 300, can easily and cost efficiently be replaced, by unfastening the bottom cap 304, removing the bottom cap 304, and replacing the bottom cap 304, without replacing half the housing, as would be the case with a two-piece clam-shell style housing.

It will be appreciated that the apparatus disclosed herein can be applied to a variety of hand held terminals, such as scanners, digital cameras, cell phones, and mobile computers.

A small sample of apparatus that are described herein is as follows:

A1. A hand held computer terminal comprising:
a housing comprising a main body and a bottom cap, wherein the main body comprises a bottom opening, wherein the bottom cap fits over the bottom opening, wherein the bottom cap comprises a strap mount for attaching a hand strap, and wherein the bottom cap comprises an electrical connector opening for mounting an electrical connector.

A2. The hand held computer terminal of A1 wherein the hand held computer terminal comprises an internal frame member inserted within the main body of the housing, and wherein the bottom cap is fastened to the internal frame member.

A3. The hand held computer terminal of A1, wherein the bottom cap has an outside surface and an inside surface, wherein the inside surface comprises a slot engageable with the bottom of the main body of the housing.

A4. The hand held computer terminal of A1, wherein the strap mount is an opening defined through the bottom cap.

A5. The hand held computer terminal of A1, wherein the bottom cap comprises a top edge, wherein the strap mount comprises a projection projecting from the top edge, and wherein the projection defines an opening through the projection.

A6. The hand held computer terminal of A1, wherein the main body further comprises a top opening, wherein the hand held computer terminal further comprises a top cap, and wherein the top cap fits over the top opening.

A7. The hand held computer terminal of A5, wherein the main body further comprises a battery compartment opening, wherein the hand held computer terminal further comprises a battery compartment door, wherein the battery compartment door fits over the battery compartment opening and comprises a bottom edge, wherein the battery compartment door comprises a cutout slot on the bottom edge, and wherein the strap mount matingly fits into the cutout slot.

A8. The hand held computer terminal of A1, further comprising a bottom seal positioned between the bottom mount and the main body to seal the joint between the bottom mount and the main body.

A9. The hand held computer terminal of A6, further comprising a top seal positioned between the top cap and the main body to seal the joint between the top cap and the main body.

A10. The hand held computer terminal of A1, wherein the bottom cap is more resistant to physical impact than the main body.

B1. A bottom cap of a housing of a hand held computer terminal, the bottom cap comprising:
a strap mount for attaching a hand strap; and
a releasable fastener to releasably fasten the bottom cap to a main body of the housing of the hand held computer terminal,
wherein the strap mount comprises an electrical connector opening for mounting an electrical connector.

B2. The bottom cap of B1 wherein the bottom cap is fastenable to an internal frame member, wherein the internal frame member is insertable within the main body of the housing and fasteneable to the main body of the housing.

B3. The bottom cap of B1, wherein the bottom cap has an outside surface and an inside surface, and wherein the inside surface comprises a slot engageable with the bottom of the main body of the housing.

B4. The bottom cap of B1, wherein the strap mount is an opening defined through the bottom cap.

B5. The bottom cap of B1, wherein the bottom cap comprises a top edge, wherein the strap mount comprises a projection projecting from the top edge, and wherein the projection defines an opening through the projection.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. A hand held computer terminal comprising:
a housing comprising a main body and a bottom cap, wherein the main body comprises a bottom opening, wherein the bottom cap fits over the bottom opening, wherein the bottom cap comprises a strap mount for attaching a hand strap, and wherein the bottom cap comprises an electrical connector opening for mounting an electrical connector.

2. The hand held computer terminal of claim 1 wherein the hand held computer terminal comprises an internal frame member inserted within the main body of the housing, and wherein the bottom cap is fastened to the internal frame member.

3. The hand held computer terminal of claim 1, wherein the bottom cap has an outside surface and an inside surface, wherein the inside surface comprises a slot engageable with the bottom of the main body of the housing.

4. The hand held computer terminal of claim 1, wherein the strap mount is an opening defined through the bottom cap.

5. The hand held computer terminal of claim 1, wherein the bottom cap comprises a top edge, wherein the strap mount comprises a projection projecting from the top edge, and wherein the projection defines an opening through the projection.

6. The hand held computer terminal of claim 5, wherein the main body further comprises a battery compartment opening, wherein the hand held computer terminal further comprises a battery compartment door, wherein the battery compartment door fits over the battery compartment opening and comprises a bottom edge, wherein the battery compartment door comprises a cutout slot on the bottom edge, and wherein the strap mount matingly fits into the cutout slot.

7. The hand held computer terminal of claim 1, wherein the main body further comprises a top opening, wherein the hand held computer terminal further comprises a top cap, and wherein the top cap fits over the top opening.

8. The hand held computer terminal of claim 7, further comprising a top seal positioned between the top cap and the main body to seal the joint between the top cap and the main body.

9. The hand held computer terminal of claim 1, further comprising a bottom seal positioned between the bottom cap and the main body to seal the joint between the bottom cap and the main body.

10. The hand held computer terminal of claim 1, wherein the bottom cap is more resistant to physical impact than the main body.

11. The hand held computer terminal of claim 1, wherein the strap mount is integral with the bottom cap.

12. The hand held computer terminal of claim 1, wherein the main body of the housing is one contiguous piece forming a tube structure.

13. The hand held computer terminal of claim 1, wherein the bottom cap includes an electrical connector removably attached thereto.

14. The hand held computer terminal of claim 1, wherein the bottom cap includes an electrical connector permanently attached thereto.

15. A bottom cap of a housing of a hand held computer terminal, the bottom cap comprising:
a strap mount for attaching a hand strap; and
a releasable fastener to releasably fasten the bottom cap to a main body of the housing of the hand held computer terminal,
wherein the strap mount comprises an electrical connector opening for mounting an electrical connector.

16. The bottom cap of claim 15 wherein the bottom cap is fastenable to an internal frame member, wherein the internal frame member is insertable within the main body of the housing and fastenable to the main body of the housing.

17. The bottom cap of claim 15, wherein the bottom cap has an outside surface and an inside surface, and wherein the inside surface comprises a slot engageable with the bottom of the main body of the housing.

18. The bottom cap of claim 15, wherein the strap mount is an opening defined through the bottom cap.

19. The bottom cap of claim 15, wherein the bottom cap comprises a top edge, wherein the strap mount comprises a projection projecting from the top edge, and wherein the projection defines an opening through the projection.

* * * * *